United States Patent [19]
Weaver

[11] Patent Number: 5,311,182
[45] Date of Patent: May 10, 1994

[54] METHOD AND APPARATUS FOR REGENERATING A DISTORTED BINARY SIGNAL STREAM

[75] Inventor: Charles S. Weaver, Palo Alto, Calif.

[73] Assignee: Neural Systems Corporation, Los Altos Hills, Calif.

[21] Appl. No.: 976,481

[22] Filed: Nov. 16, 1992

[51] Int. Cl.$^5$ ............................................. H03M 1/12
[52] U.S. Cl. .................................... 341/155; 341/122
[58] Field of Search .......................... 341/67, 94, 155; 371/5.1, 8.2, 31, 34, 35, 37.3, 41, 43

[56] References Cited

U.S. PATENT DOCUMENTS 5,136,593  8/1992  Moon et al. ............................ 371/43

OTHER PUBLICATIONS

D. E. Rumelhart et al "Parallel Distributed Processing: Explorations in Microstructure of Cognitioin" vol. 1 1986 pp. 318-362.

Primary Examiner—Brian K. Young
Attorney, Agent, or Firm—Victor R. Beckman

[57] ABSTRACT

Apparatus is shown for regenerating a signal stream of binary digits which has been distorted by intersymbol interference during passage through a channel (10 and 12) having insufficient channel bandwidth such that the channel output waveform comprises substantially an analog signal. (FIG. 2 at B and D.) After equalization (24) the channel output is converted to a digital sample signal stream at analog-to-digital converter (26). The converter (26) output is supplied to shift register (28) from which successive groups of digital sample signals produced over a plurality of bit intervals of channel output are shifted to decoder (22). Initialization bits that immediately precede the first group of binary digits to be regenerated also are supplied to decoder (22) through sector header reader (20) for use in decoding the first group of digital sample signals supplied to the decoder. During decoding of subsequent groups of digital sample signals, end bits (3,4 and 5) from the preceding group of regenerated binary digits are supplied to the decoder (22). The decoder includes a plurality of trained networks (40-1 through 40-5 and 50-1 through 50-m) of either the neural network or binary tree type.

17 Claims, 4 Drawing Sheets

METHOD AND APPARATUS FOR REGENERATING A DISTORTED BINARY SIGNAL STREAM

FIELD OF THE INVENTION

This invention relates generally to method and apparatus for regenerating a signal stream of binary digits which has been subjected to distortion.

BACKGROUND OF THE INVENTION

In electrical communication systems information often is transmitted over a binary channel by use of a series of binary digits such as 0's and 1's. Often, the bit stream in the channel is distorted by transients from a bit interval extending into one or more subsequent bit intervals. Such distortion is known as intersymbol interference (ISI). As a result of such intersymbol interference, the channel output may substantially comprise an analog waveform rather than a binary bit stream.

The amount of ISI is dependent upon the channel bandwidth; the channel bandwidth sets the upper limit on the bit rate that can be transmitted through the channel. In a linear, or substantially linear, binary channel, the bit error rate is determined by the channel signal-to-noise ratio and the channel bandwidth. In practice, the maximum bit rate that can be employed is highly dependent upon the method and means used to detect the distorted binary digits at the channel output. The present invention is directed to method and apparatus for regenerating the distorted binary signal stream.

The binary signal regeneration method and apparatus of the present invention is not limited to any particular application. The invention is useable, for example, in binary communications systems for transmission of digitized text, graphics, audio and/or video signals. For example, the invention is well adapted for interconnection of computers in, say, computer networks. It may be used in repeater stations included in binary signal transmission systems. Another use includes the regeneration of digital signals that have been subjected to magnetic recording and playback, such as those from a magnetic storage disk employed in a computer. In this application, the channel includes magnetic recording and playback means. As will become apparent, the invention is not limited to such uses.

SUMMARY AND OBJECTS OF THE INVENTION

An object of this invention is the provision of an improved method and apparatus for regenerating a signal stream of binary digits that has been subjected to distortion by intersymbol interference.

An object of this invention is the provision of an improved binary signal regenerating method and means of the above-mentioned type that is capable of operating with a high degree of accuracy at high bit rates.

An object of this invention is the provision of an improved binary signal regenerating method and means of the above mentioned type that can be trained to operate on noisy bit streams subjected to intersymbol interference.

The present invention makes use of the fact that, in the absence of additive noise and dropouts, a given group of binary digits within a bit stream supplied to a channel will produce a channel output waveform that is dependent both upon the sequence of digits in the group and transients resulting from previous bit intervals. Transient response dies out after a number of bit intervals say, for example, three bit intervals. In this case, a given group of binary digits preceded by a given three-bit sequence will always cause the same channel output waveform. The problem then is to associate the waveform with the sequence of bits within said group. In a practical system there always will be noise. A decoder, in the form of networks, such as binary tree or neural networks, can be trained to recognize the different channel output waveforms in noise and associate the recognized waveforms with the binary input.

In accordance with the present invention, the analog channel output waveform is supplied to an analog-to-digital converter for digitizing the distorted signal stream. A decoder is provided for successively producing groups of X substantially undistorted binary digits that correspond to successive groups of X binary digits supplied to the channel for regenerating the signal stream. The decoder is responsive both to successive groups of output signals from the analog-to-digital converter means produced over successive X-bit intervals of channel output and to at least some end bits from the preceding group of X-bits from the decoder. Here, X is a whole number greater than the bit interval transient response of the channel. Where, for example, the transient response, R, of the channel is three bit intervals long, the decoder may be responsive to analog-to-digital converted samples produced over, say, five bit intervals, and to the 3 end bits from the preceding group of regenerated binary digits from the decoder.

The decoder comprises one or more trained networks, such as non-arithmetic pattern recognizing binary tree or neural networks, which are trained to recognize digitized waveforms in noise. A plurality of networks are preferred for better accuracy. Where, for example, three decoded end bits are employed in the decoding process for the succeeding five bits, the decoder may include eight networks, each with a plurality of outputs. With this arrangement, the end bits are used to switch the analog-to-digital converter output to one of the eight networks dependent upon the decoded end bits. Each network need recognize only one-eighth of the total number of patterns.

In another embodiment, the number of networks employed in the decoder may equal the number of bits, X, included in each group of bits that are successively decoded. With this arrangement, the input to each network comprises both the analog-to-digital converter output and the decoded end bits from the preceding group of bits from the decoder, and each network produces a single binary digit output.

Initializing bits having a known sequence precede the first group of binary digits to be regenerated, which initializing bits are supplied to the decoder during regeneration of said first group of binary digits. Thereafter, end bits from the preceding group of regenerated binary digits are supplied to the decoder.

The above and other objects and advantages will become apparent from the following description in view of the drawings. It will be understood that the drawings are for purposes of illustration only and not by way of limitation.

BRIEF DESCRIPTION OF THE DRAWINGS

In the drawings, wherein like reference characters refer to the same parts in the several views.

Figure 1:
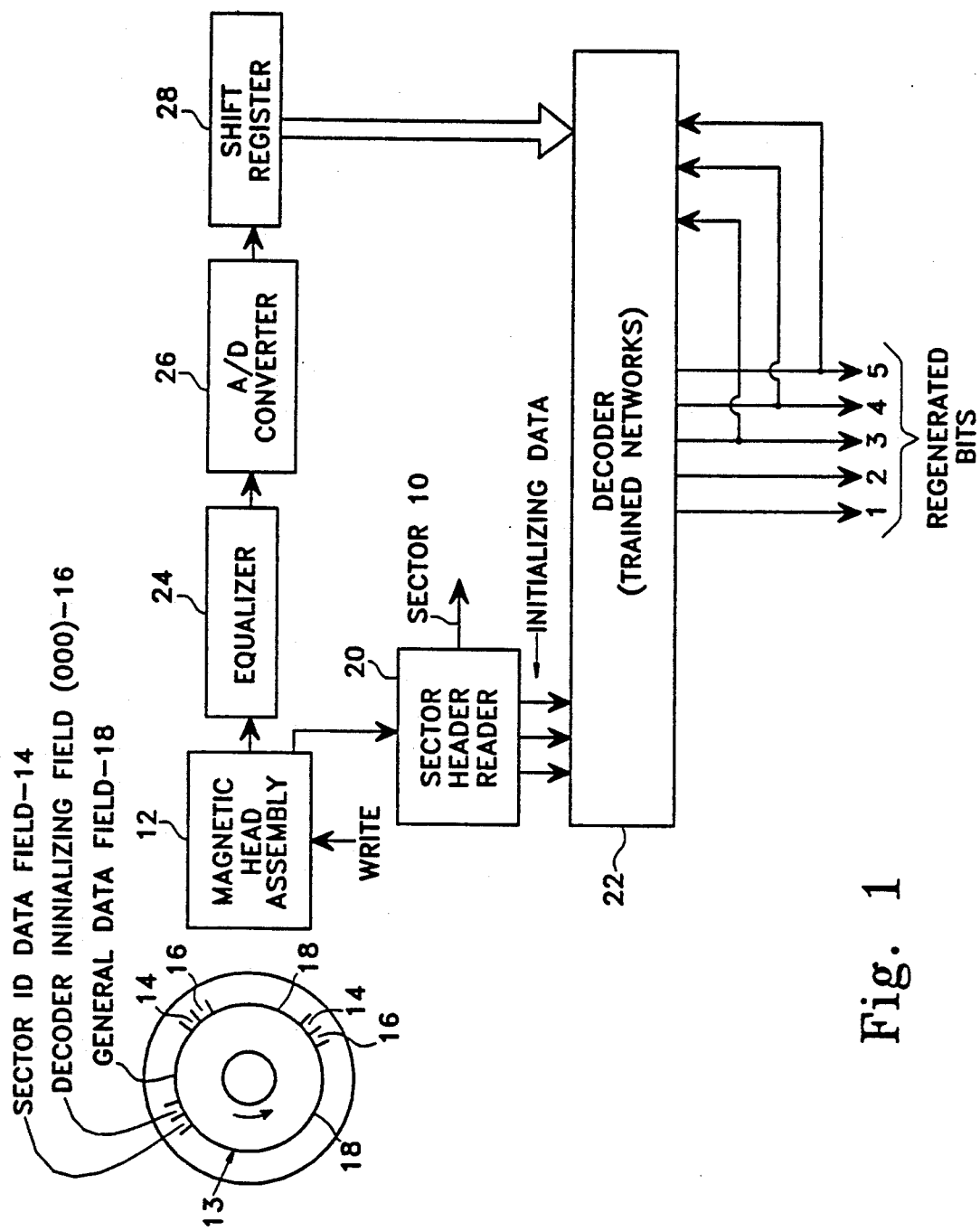
FIG. 1 is a schematic diagram showing a system for regenerating a bit stream embodying the present invention.

Reference first is made to FIG. 1 wherein a system for regenerating a distorted binary signal stream that embodies the present invention is shown. For purposes of illustration, the distorted bit stream to be regenerated is shown obtained from a magnetic storage disk 10 and associated magnetic head assembly 12 for reading from and writing to the disk. The magnetic storage disk 10 includes a plurality of concentric tracks, one of which is identified by the reference numeral 13. Each track includes a plurality of sectors, each of which sectors includes a sector identification (ID) data field 14 for use in identifying the individual sectors, a decoder initializing field 16 for use in initializing decoder means included in the bit stream regenerator of this invention, and a general data field 18 for storage of general data. Writing to the disk through magnetic head assembly 12 is provided by means not shown in any well-known manner.

The decoder initializing field 16 comprises a small group of bits having a predetermined bit sequence recorded adjacent the general data field 18. The number of bits included in the decoder initializing field 16 is dependent upon the transient response of the channel. If, for example, the transient response dies out after three bit intervals, then the decoder initializing field 16 may include three bits. The same three bits are employed at each sector, and, for purpose of illustration, the decoder initializing fields 16 are shown to contain the three-bit sequence 0,0,0. These three bits immediately precede data that is to be regenerated using the bit stream regeneration means of this invention. The transient response is the same for each such field 16 since the fields comprise the same bit sequence.

Figure 3:
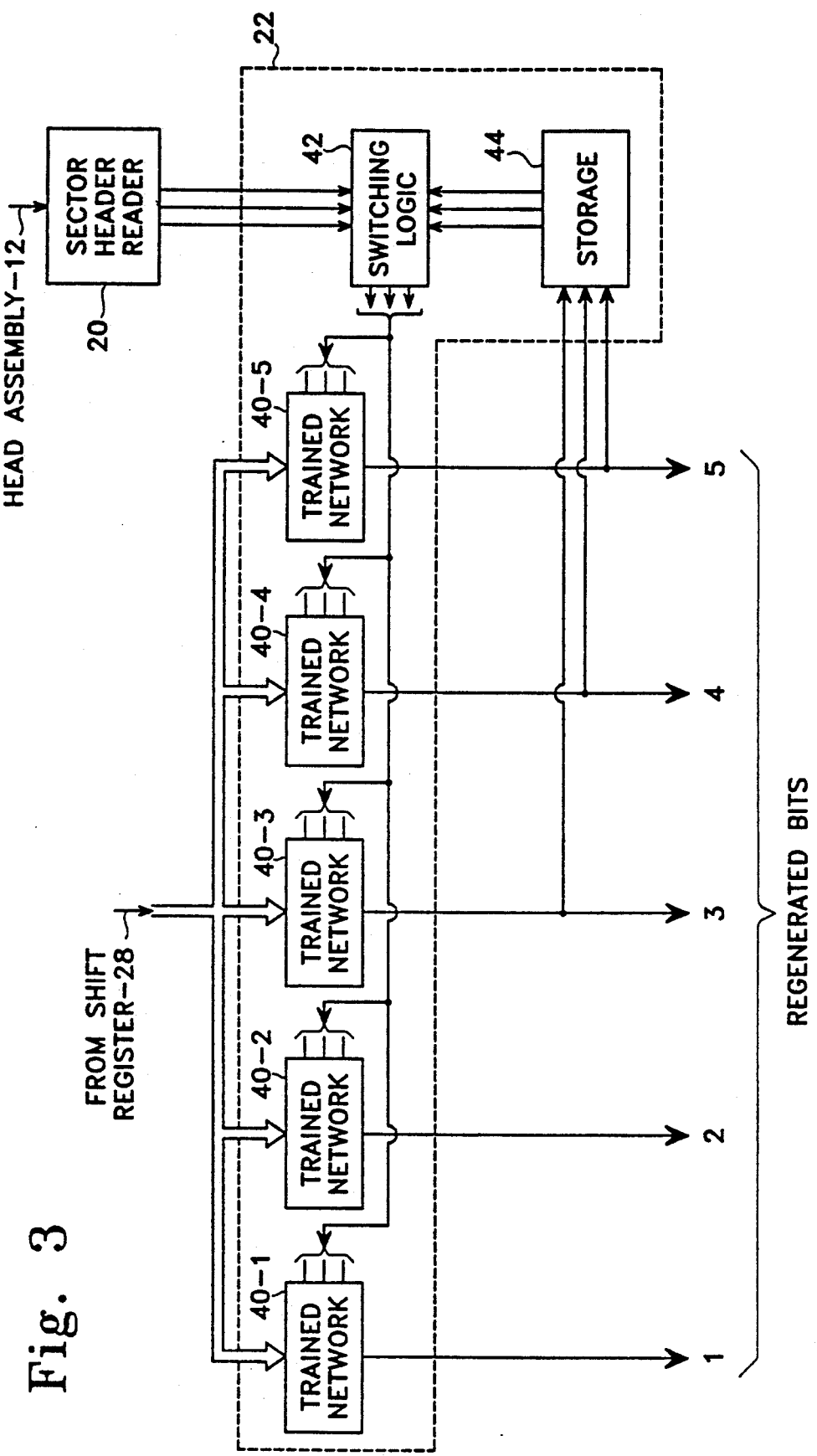
FIG. 3 is a schematic diagram showing details of the decoder shown in FIG. 1 embodying this invention.
Figure 4:
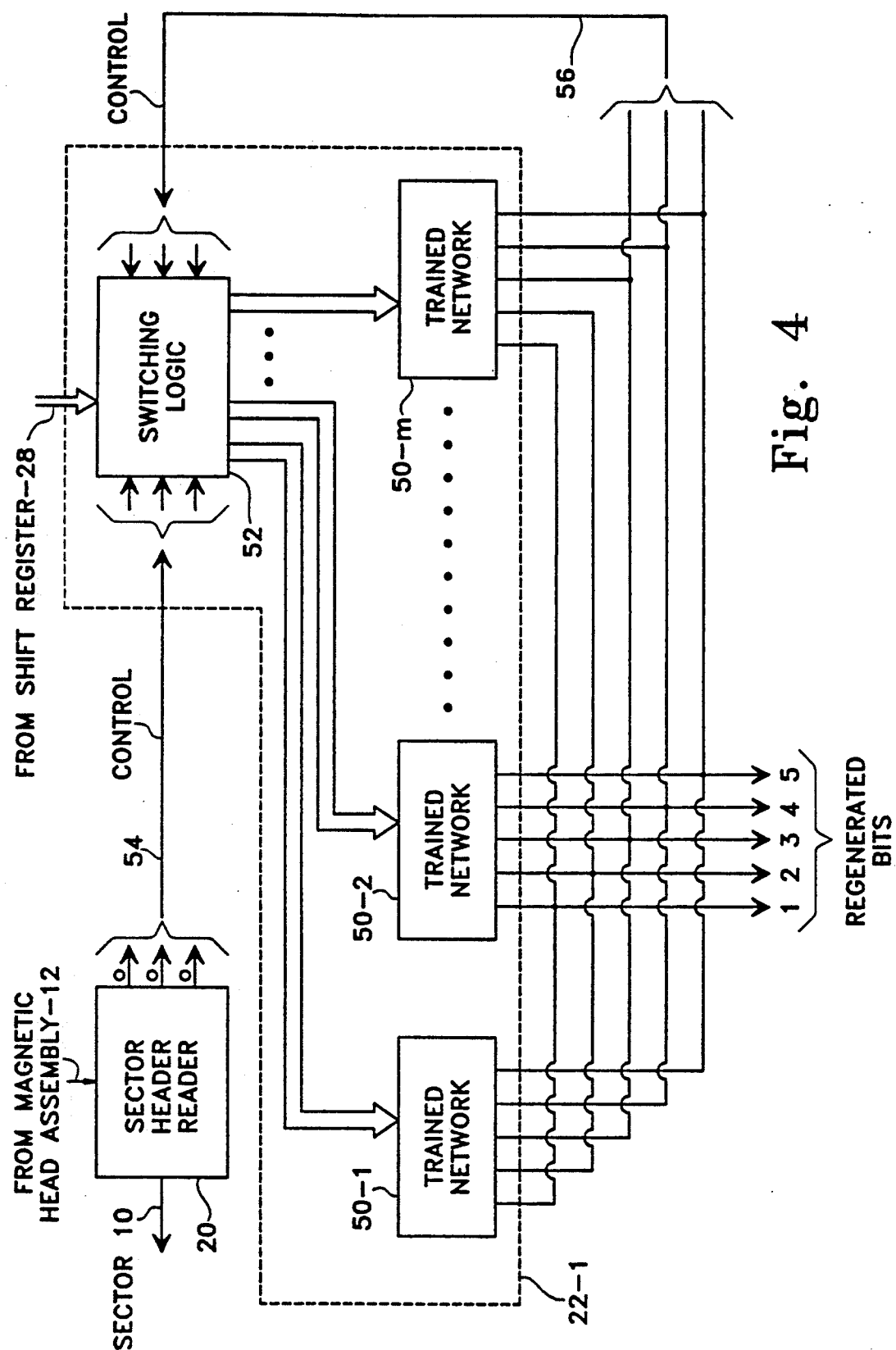
FIG. 4 is a schematic diagram showing a modified form of decoder also embodying this invention.

The sector ID data and decoder initializing data from fields 14 and 16, respectively, are read by sector header reader means 20 through the magnetic head assembly 12. The initializing data from reader means 20 is supplied to decoder means 22 for use in regenerating data included in the general data fields Different decoder means 22 for use in the present invention are shown in FIGS. 3 and 4 of the drawings described hereinbelow. For present purposes, it will be understood that decoder means 22 includes one or more trained networks, such as artificial neural or binary tree networks.

General digital data which has been recorded on magnetic disk lo and read back through magnetic head assembly 12 is supplied to equalizer 24 for equalizing the same. Because of intersymbol distortion, the digital data stream from the magnetic head assembly 12 is distorted such that the signal at the equalizer 24 comprises, essentially, an analog signal. The output from equalizer 24 is fed to an analog-to-digital converter 26 which samples the incoming voltage at a predetermined rate. The sample rate of the analog-to-digital converter is greater than the bit rate of the distorted binary stream supplied thereto from the equalizer. For example only, a minimum sample rate of substantially two times the bit rate may be employed.

The output from the analog-to-digital converter is supplied to decoder 22 through shift register 28. Groups of digitized signals from the analog-to-digital converter 26 produced over a plurality of bit intervals of equalizer 24 output are supplied to decoder 22 through the shift register for regenerating successive groups of binary signals written onto the magnetic storage disk 10. The decoder output comprises successive groups of binary digits and, for purposes of illustration only, the output is shown to comprise a group of five (5) binary digits numbered 1 through 5. The three end bits 3, 4 and 5 of the decoder output are fed forward to the decoder for use in decoding the next group of digitized signals supplied to the decoder from the analog-to-digital converter 26 through shift register 28.

Figure 2:
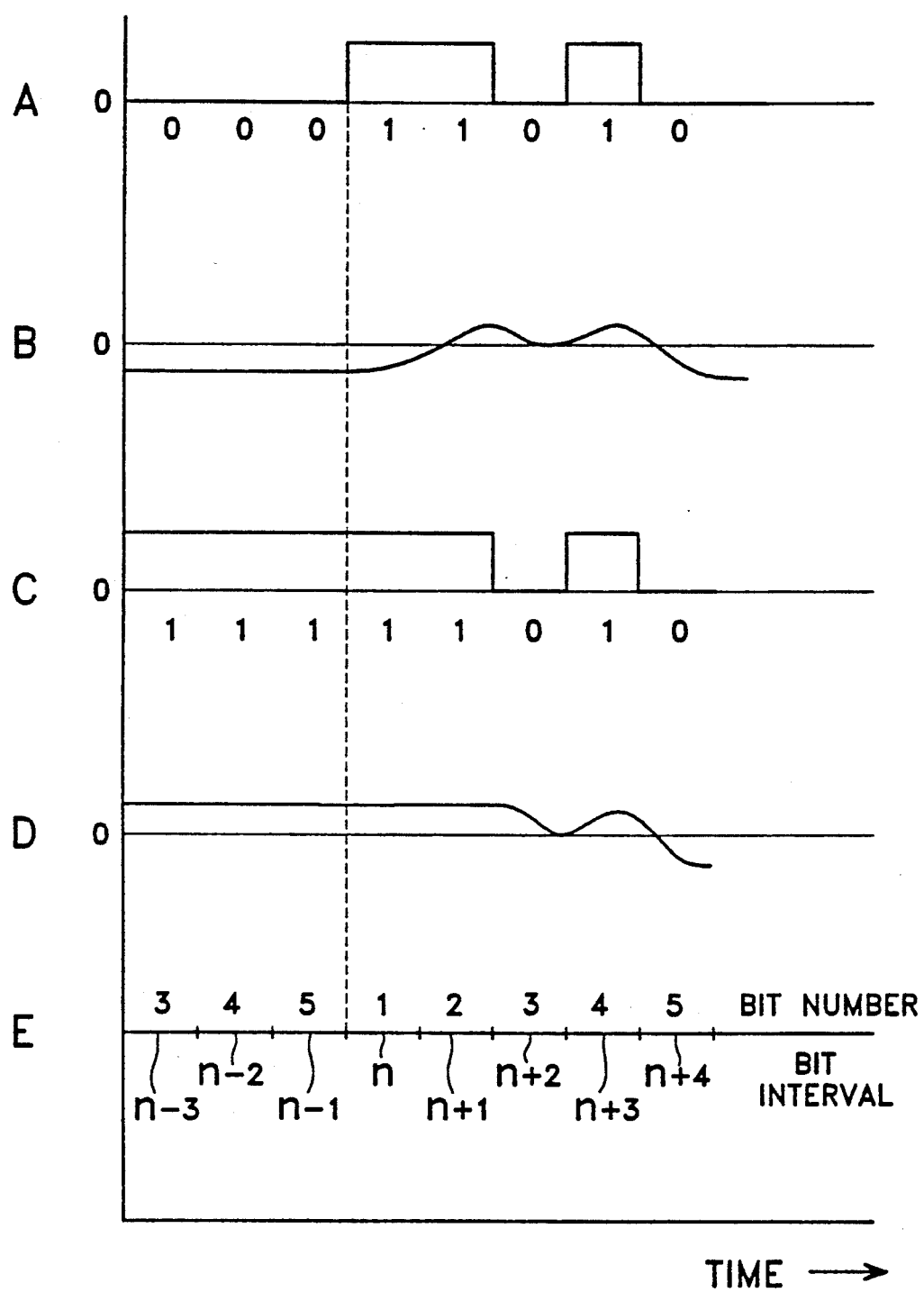
FIG. 2 shows binary digit signals subjected to intersymbol interference for use in explaining operation of the system of this invention.

Before describing operation of decoders shown in FIGS. 3 and 4, the effect of intersymbol interference on a digital signal stream is described with reference to FIG. 2, to which figure reference now is made. In FIG. 2, line E, five (5) bit intervals labelled n through n+4 preceded by three (3) bit intervals n−3 through n−1 are shown. At waveforms A and C of FIG. 2, intervals n through n+4 comprise the binary sequence

11010.

At waveform A, the five-bit sequence is preceded by three zero bits (0,0,0) and at waveform C, it is preceded by three one bits (1,1,1). Waveforms A and C depict inputs to a channel, such as the recording and playback system illustrated in FIG. 1. If the channel bandwidth is not sufficient, the channel rise time will distort individual bits, and transients from previous bit intervals will extend into following bit intervals.

In FIG. 2, channel outputs for waveforms A and C are shown at B and D, respectively. Because of intersymbol interference, the channel output is distorted and comprises, essentially, an analog signal. It will be noted that the same five-bit input binary sequence (11010) results in a different channel output dependent upon the three-bit sequence immediately preceding the same.

The transient response of the illustrated channel dies out after three bit intervals as seen in FIG. 2. Consequently, there will be no information affecting the bit in interval n prior to the interval n−3. Therefore the Bayes optimum or minimum error rate choice does not depend on anything earlier than the n−3 interval when decoding bit intervals n and greater. In this case, there will be $2^3$, or 8, possible prior transient responses affecting any bit interval being decoded.

Assume that five bit intervals are to be decoded starting with interval n. For each transient response there are $2^5$, or 32, possible waveforms in the interval n to n+4. If there are no dropouts or distortion and the noise power is zero, then there will be exactly eight different waveforms from equalizer 24 that may occur with the above-mentioned input sequence of 11010. Thus, if there was no noise and the system was totally time invariant, there would be exactly 8×32 or 256 possible waveforms in any group of five bit interval. In this situation, it is helpful not to consider intersymbol interference as noise since, in this idealized system, the transient response for a given three bits in intervals n−3, n−2 and n−1 always is the same.

The lowest error probability in decoding intervals n, ..., n+4 occurs if the bits in intervals n−3, ... n−1 are known. Then, there are only 32 patterns in noise to recognize. The three bits in initializing field 16 (here 0,0,0) are known with certainty and are employed by decoder 22 for decoding, or regenerating the first five bits immediately following the same. To decode the next five-bit interval (n+5 through n+9 not shown in FIG. 2) the decoded bits from intervals n+2, n+3 and n+4 are fed forward to the decoder for use in the decoding process. Subsequent groups of five bit intervals are similarly decoded using decoded, or regenerated, end bits from the preceding group. With this arrangement, successive groups of bits are regenerated with a high degree of certainty.

Reference now is made to FIG. 3 wherein details of a decoder 22 which may be employed in the bit stream regeneration system of FIG. 1 are shown. In this embodiment, the decoder comprises a plurality of trained networks, the number of which networks equals the number of bits that are successively regenerated. Either trained artificial neural networks or trained binary tree networks may be used. In the illustrated arrangement wherein groups of five bits are regenerated, the decoder includes five trained networks 40-1 through 40-5. Each network produces a single bit output at one of the output lines 1 through 5.

Each trained network in the decoder is provided with the same vector input. Input vector elements to the networks are obtained from shift register 28 and from switching logic 42. Inputs to switching logic 42 are provided from sector header reader 20 and from momentary storage 44, to which momentary storage means a plurality of end bits from the decoder output are supplied. Where transient response dies out after three bit intervals, three end bits at lines 3, 4 and 5 of the decoder are written into storage means 44. Initializing bits from sector header reader 20 are supplied to the trained networks through switching logic 42 during regeneration of the first group of five (5) bits following the initializing bits. As noted above, initializing bits may comprise a sequence of three zero bits. After the first bit group is decoded, the last three bits of the regenerated group are written into storage 44 for use in regenerating the next group of bits.

If, for example, the analog-to-digital converter 26 samples the equalizer 24 output twice every bit interval, and converts each sample to an 8-bit binary signal, groups of 2×5×8=80 input bits are supplied to the trained networks 40-1 through 40-5 through shift register 28. In addition, three bits comprising either initializing bits from sector header reader 20 or end bits from the previous group of regenerated bits are supplied as inputs to the trained networks through switching logic 42. With such an arrangement, vector inputs comprising 80+3=83 vector elements are supplied to each trained network 40-1 through 40-5.

Trained artificial neural networks suitable for use in the present invention are well known. For example, backward error propagation type networks such as those shown by D. E. Rumelhart et al. in *Parallel Distributed Processing: Explorations in the Microstructure of Cognition* Vol. 1, 1986, pp. 318–362 may be employed. Also, non-arithmetic pattern recognizing binary tree networks such as shown in co-pending U.S. patent application Ser. No. 07/661,330, filed Feb. 27, 1991, entitled "Method for Producing a Binary Tree, Pattern Recognition and Binary Vector Classification Method Using Binary Trees, and System for Classifying Binary Vectors" may be employed. The entire contents of said U.S. patent application Ser. No. 07/661,330, now U.S. Pat. No. 5,263,124 issued Nov. 16, 1993, specifically is incorporated by reference herein.

The trained networks 40-1 through 40-5 are individually trained, or generated, using training vectors derived from known digitized five-bit patterns together with initializing bits or end bits from the previous group of bits. The training, or construction, of artificial neural networks using known input data and desired output data is well known in the prior art. By including noisy training vectors in the set of training vectors, the trained networks 40-1 through 40-5 may be made to operate correctly on noisy environments. The trained networks may be implemented in hardware or by means of suitably programmed digital computers.

Although operation of the system of FIG. 1 using a decoder of the type shown in FIG. 3 is believed to be apparent, a brief description thereof now will be given. For purposes of illustration, a distorted binary digit stream for decoding using the decoder shown in FIG. 3 is obtained from a magnetic storage disk 10 and associated magnetic head assembly 12 shown in FIG. 1. The recording disk includes a plurality of concentric tracks 13, each of which is divided into sectors having individual sector identification data fields 14 and general data fields 18. An initializing field 16 containing a known bit sequence (e.g. 0,0,0) is included immediately adjacent the general data fields for use in initializing the decoder. The initialization bits contained in the initializing field are read by sector header reader 20 through magnetic head assembly 12 and are supplied to each of the networks 40-1 through 40-5 through switching logic 42.

Data in general data fields 18 read by magnetic head assembly 12 and subjected to equalization at equalizer 24 is highly distorted as a result of intersymbol interference and appears as an analog signal as seen in FIG. 2. The signal from equalizer 24 is digitized by analog-to-digital converter 26 operating at a sampling rate greater than the bit rate of the distorted signal stream, say, at a sampling rate of 2 times the distorted signal stream bit rate. The digitized signal stream is supplied to a shift register 28, and groups of five digitized bits are supplied as input data to each of the five trained networks 40-1 through 40-5.

Additional input data comprising either initializing bits from sector header reader 20 or the last three bits from the previous reconstructed group of data bits from storage means 44 is supplied to the trained networks 40-1 through 40-5 through switching logic 42. As described above, these additional data input bits, which correspond to those bits immediately preceding the group of bits to be regenerated, are required because of intersymbol interference produced by said preceding bits on the group of bits being regenerated. In response to the input data, trained network 40-1 regenerates the first bit of the group of digitized bits supplied thereto from shift register 28, trained network 40-2 regenerates the second bit said group, etc. When regenerating successive groups of bits from a sector of the magnetic storage disk, initializing bits from sector header reader 20 are supplied to the trained networks through switching logic 42 during regeneration of the first group. Then, during regeneration of subsequent groups of bits, a plurality of trailing bits from the immediate previously regenerated group of bits are supplied to the trained networks through switching logic 42. The number of additional bits supplied to the networks is dependent upon the transient response of the channel and, for purposes of illustration, three such bits are shown used. With this arrangement, wherein the same input vector is supplied to each of the trained networks 40-1 through 40-5, each network transforms the input to a single output bit of the group of regenerated bits.

The present invention is not limited to use of the decoder 22 illustrated in FIG. 3. In FIG. 4, to which reference now is made, a modified form of decoder 22-1 is shown which includes a plurality of trained networks such as binary tree or artificial neural networks 50-1 through 50-m, where m is the total number of possible prior transient responses affecting the digitized group of binary digits to be decoded. In the above example, wherein the transient response extends for three bit intervals, the total number of transient responses affecting the digitized group of binary digits to be decoded equals 8 for a total of 8 networks 50-1 through 50-8. With the present arrangement, each trained network is adapted to regenerate a group of digitized input bits supplied thereto. Where, for example, groups of five bits are regenerated, each trained network 50-1 through 50-8 provides the five binary outputs at lines 1 through 5. The trained network selected for the regeneration operation is dependent upon the three bits that immediately precede said group. Table I shows the relationship between the three preceding bits and the trained network selected for operation.

TABLE I

| Bits | Network |
| --- | --- |
| 000 | 50-1 |
| 001 | 50-2 |
| 010 | 50-3 |
| 011 | 50-4 |
| 100 | 50-5 |
| 101 | 50-6 |
| 110 | 50-7 |
| 111 | 50-8 |

Input vectors are supplied to the trained networks 50-1 through 50-8 from shift register 28 through switching logic 52. Control signals for control of switching logic 52 are provided by initializing bits from sector header reader 20 and by end bits from the previously regenerated bit group. When initializing bits (0,0,0) are supplied to switching logic 52 over line 54, the five digitized bit intervals from shift register 28 are connected by said switching logic to the one network that is adapted to regenerate signals preceded by three zero bits (0,0,0), here trained network 50-1. In this case, trained network 50-1 is selected for transforming the digitized bits from shift register 28 to a five-bit output at lines 1-5. Assuming the output comprises the binary sequence 1,1,0,1,0, the last three bits 0,1,0 thereof are supplied to switching logic 52 over line 56 whereupon the next group of digitized bit intervals is supplied to trained network 50-3 for transformation thereof into a regenerated group of five binary digits at output lines 1-5. As with the system illustrated in FIG. 3, the trained networks 50-1 through 50-m may comprise either trained binary trees or trained artificial neural networks.

In operation, when decoding data read from magnetic storage disk 10, initializing data (here, 0,0,0) read from initializing field 16 by sector header reader 20 through magnetic head assembly 12 is supplied over line 50 as a control signal to switching logic 52. With this control input to switching logic 52, the shift register 28 output is supplied to trained network 54-1 through the switching logic. (See Table I). Upon regenerating the first group of bit intervals, the network output is provided at lines 1-5, and the last three bits of the output are supplied as a control signal over line 56 to switching logic 52. The next group of digitized bit intervals is supplied to the trained network chosen by the control signal, and the process of regenerating successive groups of bit intervals continues.

The invention having been described in detail in accordance with requirements of the Patent Statutes, various other changes and modifications will suggest themselves to those skilled in the art. For example, in the FIG. 4 arrangement, switching logic 52 may be deleted and the shift register 28 output simultaneously supplied to each of the trained networks 50-1 through 50-m. One trained network then could be selected for operation under control of control signals at control lines 54 and 56 from sector header reader 20 and the last three bits of the previously regenerated group of bits.

Obviously, many different combinations of trained networks may be employed in the decoder, the invention not being limited to the arrangements of trained networks illustrated in the drawings. Also, as mentioned above, trained networks for use in the present invention may be implemented in software using digital computer means, or in hardware, after the training, or learning, period. As noted above, training of the networks involves the use of input training vectors and associated outputs to be produced by said input vectors. Additionally, as noted above, equalizer 24 is not a required element of the invention and may be deleted from the signal regeneration system. It is intended that the above and other such changes and modifications shall fall within the spirit and scope of the invention as defined in the following claims.

I claim:

1. Apparatus for regenerating an input signal stream of binary digits which has been distorted by intersymbol interference during passage through a channel having a channel output comprising a stream of distorted binary digits, said apparatus comprising:

analog-to-digital converter means having a sample rate greater than the bit rate of the stream of distorted binary digits from the channel output for digitizing the stream of distorted binary digits from the channel output and producing an output comprising a stream of digitized binary digits, decoder means comprising a plurality of train non-arithmetic pattern-recognizing binary tree networks that implement binary logic for decoding successive groups of digitized binary digits from the analog-to-digital converter means and producing a decoder output of successive groups of binary digits corresponding to successive groups of binary digits in said input signal stream, said groups of binary digits produced by said decoder means including a first group and subsequent groups, each of which subsequent groups is preceded by an immediately preceding group from said decoder means, means for supplying successive groups of digitized binary digits from said analog-to-digital converter means to the trained binary tree networks for decoding, and means for supplying a plurality of end bits from an immediately preceding group of binary digits produced by said decoder means to said decoder means for use by said decoder means in decoding said groups of digitized binary digits supplied to said trained binary tree networks.

2. Apparatus for regenerating an input signal stream as defined in claim 1 wherein said plurality of end bits are supplied to each of said trained binary tree networks, each said trained binary tree network producing one bit of each said group of binary digits produced by said decoder means.

3. Apparatus for regenerating an input signal stream as defined in claim 1 wherein said decoder means includes switching means responsive to said end bits supplied to the decoder means for directing said digitized groups of binary digits from the analog-to-digital converter means to a selected one of said trained binary tree networks dependent upon said end bits, the selected one of said trained binary tree networks producing said decoder output.

4. Apparatus for regenerating an input signal stream as defined in claim 1 wherein said channel includes a magnetic storage system comprising;
   a magnetic storage disc having a plurality of concentric tracks, each of said tracks including a plurality of sectors, each sector including a general data field for storing general data and a plurality of decoder initialization bits immediately preceding the general data field,
   means for reading decoder initialization bits and general data from said magnetic storage disk,
   means for supplying said decoder initialization bits from said reading means to said decoder means for initializing operation of the decoder means, and
   means for supplying said general data bits to said analog-to-digital converter means.

5. Apparatus for regenerating an input signal stream as defined in claim 4 wherein said decoder means includes switching means under control of the decoder initialization bits from the reading means for selecting one of the trained binary tree networks for use in decoding an associated digitized group of binary digits from said analog-to-digital converter means.

6. Apparatus for regenerating an input signal stream as defined in claim 4 wherein said decoder means includes switching means responsive to the decoder initialization bits from said reading means for selectively supplying said decoder initialization bits or said plurality of end bits from an immediately preceding group of binary digits produced by said decoder means to said trained binary tree networks.

7. Apparatus for regenerating an input signal stream as defined in claim 6 wherein each trained binary tree network produces one binary digit of each said group of binary digits produced by said decoder means.

8. Apparatus for regenerating an input signal stream as defined in claim 1 wherein the sample rate of the analog-to-digital converter means is twice the bit rate of the stream of distorted binary digits from the channel output.

9. Apparatus for regenerating an input signal as defined in claim 1 wherein said binary tree networks each comprise a plurality of logic gates.

10. A magnetic storage system comprising:
    a magnetic storage disk having a plurality of concentric tracks, each of said tracks including a plurality of sectors, each sector including a general data field for storing general data in binary digital form and a plurality of decoder initialization bits immediately preceding the general data field,
    means for reading/writing general data from said general data fields,
    means for reading decoder initialization bits from said magnetic storage disk,
    analog-to-digital converter means having a sample rate greater than the bit rate of general data bits read from said magnetic storage disk for digitizing general data bits read from said magnetic storage disk,
    non-arithmetic pattern-recognizing binary logic decoder means,
    means for supplying successive digitized groups of general data bits from said analog-to-digital converter means to said decoder means, said successive digitized groups including a first digitized group and subsequent digitized groups, each of said subsequent digitized groups being preceded by an immediately preceding digitized group, said decoder means being responsive to said first digitized group of general data bits and to decoder initialization bits for producing a first group of binary digits corresponding to a first group of general data bits that immediately follow the decoder initialization bits,
    after production of said first group of binary digits by said decoder means, said decoder means being responsive to said subsequent digitized groups of general data bits and to a plurality of end bits from an immediately preceding group of binary digits produced by said decoder means for producing groups of binary digits corresponding to groups of general data bits that follow said first group of general data bits.

11. A magnetic storage system as defined in claim 10 wherein said non-arithmetic pattern-recognizing decoder means comprises a plurality of trained binary tree networks to which said successive digitized groups of general data bits are supplied.

12. A magnetic storage system as defined in claim 11 wherein the sample rate of the analog-to-digital converter means is twice the bit rate of the general data bits read from the magnetic storage disk.

13. A magnetic storage system as defined in claim 10 wherein said decoder means comprises binary tree networks of logic gates.

14. In a method of regenerating a series of binary digits that has been distorted by intersymbol interference during passage through a channel having insufficient channel bandwidth, which channel produces a channel output comprising a series of distorted binary digits at a first bit rate, steps comprising
    converting the channel output to a digital sample signal stream by sampling the channel output at a bit rate greater than the first bit rate, and
    using non-arithmetic pattern-recognizing binary digital logic, recurrently regenerating successive groups of X binary digits in said series of binary digits in response both to groups of said digital sample signals produced over X-bit intervals of channel output and to binary digits that correspond to those immediately preceding the sequence of binary digits being regenerated wherein X is a whole number greater than the bit interval transient response of the channel.

15. In a method as defined in claim 14 wherein said binary digits that correspond to those immediately preceding the group of binary digits being regenerated comprise initialization bits of known value.

16. In a method as defined in claim 14 wherein said binary digits that correspond to those immediately preceding the group of binary digits being regenerated comprise and bits from the preceding group of X regenerated bits.

17. In a method as defined in claim 14 wherein said step of sampling the channel output is performed at twice the bit rate of the channel output.

* * * * *